US011262430B2

(12) United States Patent
Lehtimaki et al.

(10) Patent No.: US 11,262,430 B2
(45) Date of Patent: Mar. 1, 2022

(54) POSITIONING AND SELF-CALIBRATION MECHANISM USING MOVING AOA LOCATOR

(71) Applicant: Silicon Laboratories Inc., Austin, TX (US)

(72) Inventors: Sauli Johannes Lehtimaki, Nummela (FI); Mika Tapio Länsirinne, Espoo (FI); Jere Knaappila, Evitskog (FI); Joel Kauppo, Helsinki (FI)

(73) Assignee: Silicon Laboratories Inc., Austin, TX (US)

( * ) Notice: Subject to any disclaimer, the term of this patent is extended or adjusted under 35 U.S.C. 154(b) by 71 days.

(21) Appl. No.: 16/902,886

(22) Filed: Jun. 16, 2020

(65) Prior Publication Data
US 2021/0389406 A1  Dec. 16, 2021

(51) Int. Cl.
*H04W 64/00* (2009.01)
*G01S 5/02* (2010.01)
*H01Q 3/02* (2006.01)
*H04W 4/02* (2018.01)
*G01S 5/08* (2006.01)

(52) U.S. Cl.
CPC ............ *G01S 5/021* (2013.01); *G01S 5/0284* (2013.01); *G01S 5/08* (2013.01); *H01Q 3/02* (2013.01); *H04W 4/023* (2013.01); *H04W 64/003* (2013.01)

(58) Field of Classification Search
CPC .......... G01S 5/021; G01S 5/0284; G01S 5/08; H01Q 3/03; H04W 4/023; H04W 64/003
USPC ................................ 455/456.1, 456.5, 550.1
See application file for complete search history.

(56) References Cited

U.S. PATENT DOCUMENTS

| 9,125,165 B2* | 9/2015 | Gonikberg | G01S 5/14 |
| 9,538,332 B1* | 1/2017 | Mendelson | H04W 40/244 |
| 2012/0276921 A1* | 11/2012 | Nemeth | G01S 1/30 455/456.1 |
| 2017/0234961 A1* | 8/2017 | Steltz | G01S 1/68 342/457 |
| 2020/0116815 A1* | 4/2020 | Park | G01S 5/0252 |
| 2021/0021962 A1* | 1/2021 | Diaz Fuente | H04W 84/12 |
| 2021/0092703 A1* | 3/2021 | Min | H04B 7/0695 |
| 2021/0109184 A1* | 4/2021 | Baker | H04W 4/33 |
| 2021/0208589 A1* | 7/2021 | Qi | A45C 5/03 |

(Continued)

OTHER PUBLICATIONS

Zarrini et al., "Directional of Arrival Tag Response for Reverse RFID Localization", ACES Journal, vol. 34, No. 2, pp. 323-324, Feb. 2019.

*Primary Examiner* — Danh C Le
(74) *Attorney, Agent, or Firm* — Nields, Lemack & Frame, LLC

(57) ABSTRACT

A system and method for determining a position or a movable device is disclosed. The present system utilizes a movable device equipped with a locator device that has an antenna array such that it may determine the angle of arrival of a plurality of incoming beacon signals. In certain embodiments, the movable device is also able to measure its distance travelled. By knowing its distance moved and the angle of arrival from each beacon, the locator device is able to calculate its position as well as the position of each beacon. This procedure may be executed at regular intervals so that the movable device accurately determines its position.

20 Claims, 12 Drawing Sheets

(56) References Cited

U.S. PATENT DOCUMENTS

2021/0271238 A1* 9/2021 Ko .......................... H01Q 1/27
2021/0302528 A1* 9/2021 Wang ................... H04W 76/10

* cited by examiner

POSITIONING AND SELF-CALIBRATION MECHANISM USING MOVING AOA LOCATOR

FIELD

This disclosure describes systems and methods for determining the location of a movable device and beacons within a working area using the angle of arrival (AoA) of incoming signals from the beacons.

BACKGROUND

Algorithms for determining the direction of arrival of an incoming wireless signal are well known. These algorithms exploit the difference in phase of the incoming signal at a plurality of antenna elements. For example, a linear antenna array can be formed, where the spacing between adjacent antenna elements is constant. As the incoming signal is received, it will reach the antenna element located closest to the transmitter first. The incoming signal will then reach the other antenna elements in the antenna array based on their distance to the transmitter.

Using the difference in phase, the direction of the transmitter can be estimated. Direction of arrival is important in various applications, such as beacon location, or spatial positioning.

In certain embodiments, AoA positioning systems require an infrastructure for the locating system, such as gateways, backhaul networks, cloud services, deployment tools and calibration tools. However, in certain embodiments, such as those utilizing movable devices, including appliances and tools, a simpler system would be required. In these applications, the AoA locator is placed on the movable device and the beacons are statically disposed at fixed positions.

Knowing the absolute position of each beacon and the angle of arrival for signals emitting from each of these beacons, the movable device can acquire its absolute position using a number of different algorithms.

However, in certain environments, the level of complexity required to position the beacons in exact positions and provide those locations to the AoA locator may be overwhelming. Consequently, it would be beneficial if there were a system and method of positioning and self-calibration that could be employed.

SUMMARY

A system and method for determining a position of a movable device is disclosed. The present system utilizes a movable device equipped with a locator device that has an antenna array such that it may determine the angle of arrival of a plurality of incoming beacon signals. In certain embodiments, the movable device is also able to measure its distance travelled. By knowing its distance moved and the angle of arrival from each beacon, the locator device is able to calculate its position as well as the position of each beacon. This procedure may be executed at regular intervals so that the movable device accurately determines its position. The movable device 100 may use this information in a number of ways.

According to one embodiment, a method of determining a location of a movable device and a plurality of beacons is disclosed. The method comprises disposing the movable device at a first position, wherein the movable device comprises a locator device, having an antenna array; using the locator device to determine an angle of arrival of beacon signals transmitted by at least one of the plurality of beacons while at the first position; moving the movable device a known distance to a second position; using the locator device to determine an angle of arrival of beacon signals transmitted by the at least one of the plurality of beacons while at the second position; and determining the offset, in two dimensions, of each of the at least one of the plurality of beacons relative to the movable device, based on the angle of arrival of beacon signals transmitted by at least one of the plurality of beacons while at the first position and the second position. In certain embodiments, the movable device comprises a motion sensor and a motor; and the movable device moves itself to the second position and determines the known distance based on the motion sensor. In certain embodiments, the locator device determines an angle of arrival for all of the plurality of beacons at the first position and the second position. In some embodiments, the locator device determines an angle of arrival for at least three of the plurality of beacons at the first position and the second position. In certain embodiments, the method comprises operating the locator device in reverse AoA mode after locations of at least three of the plurality of beacons have been determined. In some embodiments, the method further comprises moving the movable device to a third position after determining the locations of the at least three of the plurality of beacons; using the locator device to perform reverse AoA to determine its position based on angle of arrival information from the at least three of the plurality of beacons; using the locator device to determine an angle of arrival of beacon signals transmitted by a different one of the plurality of beacons while at the third position; moving the movable device to a fourth position; using the locator device to perform reverse AoA to determine its position based on angle of arrival information from the at least three of the plurality of beacons; using the locator device to determine an angle of arrival of beacon signals transmitted by the different one of the plurality of beacons while at the fourth position; and determining the offset, in two dimensions, of the different one of the plurality of beacons relative to the movable device. In some embodiments, the method further comprises using the locator device to perform reverse AoA to determine its position based on angle of arrival information from the at least three of the plurality of beacons while at a third location; determining an angle of arrival of a signal from an asset disposed within a working area while at the third location; moving the movable device to a fourth location; using the locator device to perform reverse AoA to determine its position based on angle of arrival information from the at least three of the plurality of beacons while at the fourth location; determining the angle of arrival of the signal from the asset while at the fourth location; and determining a location of the asset relative to the movable device based on the angle of arrival at the third location and the fourth location. In certain embodiments, the method further comprises using the locator device to determine a working area within which the movable device operates. In some embodiments, the beacons are disposed at corners of the working area or are disposed along a perimeter of the working area. In some embodiments, the method further comprises transmitting a map to a user, wherein the locations of the plurality of beacons are indicated on the map; allowing the user to designate a working area on the map; and transmitting the working area to the locator device.

According to another embodiment, a software program, disposed on a non-transitory storage medium, is disclosed. The software program, when executed by a processing unit disposed on a movable device having a locator device, enables the movable device to: use the locator device to determine an angle of arrival of beacon signals transmitted by at least one of the plurality of beacons while at a first position; move the movable device a known distance to a second position; use the locator device to determine an angle of arrival of beacon signals transmitted by the at least one of the plurality of beacons while at the second position; and determine the offset, in two dimensions, of each of the at least one of the plurality of beacons relative to the movable device, based on the angle of arrival of beacon signals transmitted by the at least one of the plurality of beacons while at the first position and the second position. In certain embodiments, the software program enables the movable device to: operate the locator device in reverse AoA mode after locations of at least three of the plurality of beacons have been determined. In some embodiments, the software program enables the movable device to: move the movable device to a third position after determining the locations of the at least three of the plurality of beacons; use the locator device to perform reverse AoA to determine its position based on angle of arrival information from the at least three of the plurality of beacons; use the locator device to determine an angle of arrival of beacon signals transmitted by a different one of the plurality of beacons while at the third position; move the movable device to a fourth position; use the locator device to perform reverse AoA to determine its position based on angle of arrival information from the at least three of the plurality of beacons; use the locator device to determine an angle of arrival of beacon signals transmitted by the different one of the plurality of beacons while at the fourth position; and determine the offset, in two dimensions, of the different one of the plurality of beacons relative to the movable device. In certain embodiments, the software program enables the movable device to: use the locator device to perform reverse AoA to determine its position based on angle of arrival information from the at least three of the plurality of beacons while at a third location; determine an angle of arrival of a signal from an asset disposed within a working area while at the third location; move the movable device to a fourth location; use the locator device to perform reverse AoA to determine its position based on angle of arrival information from the at least three of the plurality of beacons while at the fourth location; determine the angle of arrival of the signal from the asset while at the fourth location; and determine a location of the asset relative to the movable device based on the angle of arrival at the third location and the fourth location. In some embodiments, the software program enables the movable device to: use the locator device to determine a working area within which the movable device operates.

According to another embodiment, a movable device for determining its location and a location of a plurality of beacons is disclosed. The movable device comprises a propulsion mechanism; a locator device, comprising: an antenna array; a processing unit; a memory device, comprising instructions, which when executed by the processing unit, enable the movable device to: determine an angle of arrival of beacon signals transmitted by at least one of the plurality of beacons while at a first position; move a known distance to a second position; determine an angle of arrival of beacon signals transmitted by the at least one of the plurality of beacons while at the second position; and determine the offset, in two dimensions, of each of the at least one of the plurality of beacons relative to the movable device, based on the angle of arrival of beacon signals transmitted by at least one of the plurality of beacons while at the first position and the second position. In certain embodiments, the memory device further comprises instructions, which when executed by the processing unit, enable the movable device to: operate the locator device in reverse AoA mode after locations of at least three of the plurality of beacons have been determined. In some embodiments, the memory device further comprises instructions, which when executed by the processing unit, enable the movable device to: move to a third position after determining the locations of the at least three of the plurality of beacons; perform reverse AoA to determine its position based on angle of arrival information from the at least three of the plurality of beacons; determine an angle of arrival of beacon signals transmitted by a different one of the plurality of beacons while at the third position; move to a fourth position; perform reverse AoA to determine its position based on angle of arrival information from the at least three of the plurality of beacons; determine an angle of arrival of beacon signals transmitted by the different one of the plurality of beacons while at the fourth position; and determine the offset, in two dimensions, of the different one of the plurality of beacons relative to the movable device. In certain embodiments, the memory device further comprises instructions, which when executed by the processing unit, enable the movable device to: perform reverse AoA to determine its position based on angle of arrival information from the at least three of the plurality of beacons while at a third location; determine an angle of arrival of a signal from an asset disposed within a working area while at the third location; move to a fourth location; perform reverse AoA to determine its position based on angle of arrival information from the at least three of the plurality of beacons while at the fourth location; determine the angle of arrival of the signal from the asset while at the fourth location; and determine a location of the asset relative to the movable device based on the angle of arrival at the third location and the fourth location. In some embodiments, the memory device further comprises instructions, which when executed by the processing unit, enable the movable device to: determine a working area within which the movable device operates.

BRIEF DESCRIPTION OF THE DRAWINGS

For a better understanding of the present disclosure, reference is made to the accompanying drawings, in which like elements are referenced with like numerals, and in which.

DETAILED DESCRIPTION

The present disclosure allows a movable device to determine its own position as well as that of a plurality of beacons without a complex setup process. Assume a consumer has purchased a robotic appliance or tool, that is to travel autonomously within a fixed area, referred to as the working area. Such a system requires an installation and calibration procedure to learn the working area and its initial position within that working area. However, for ease of use, this installation procedure needs to be simple.

One approach is to utilize reverse AoA, as there would be no needed for a locator infrastructure and the end user can easily place small one-antenna beacons at the boundaries of the working area. Still, for the robotic appliance to locate itself, it needs to know the positions of these beacons. For the end user, it could be a complicated task to measure all the beacon positions manually and accurately; and to input this information to the robotic appliance.

Thus, this disclosure describes several calibration mechanisms which require a minimal number of known beacon positions and allow the robotic appliance to autonomously discover all the beacon positions, the shape of the working area and its location within the working area. Various operations may be performed once this information has been determined.

Figure 1:
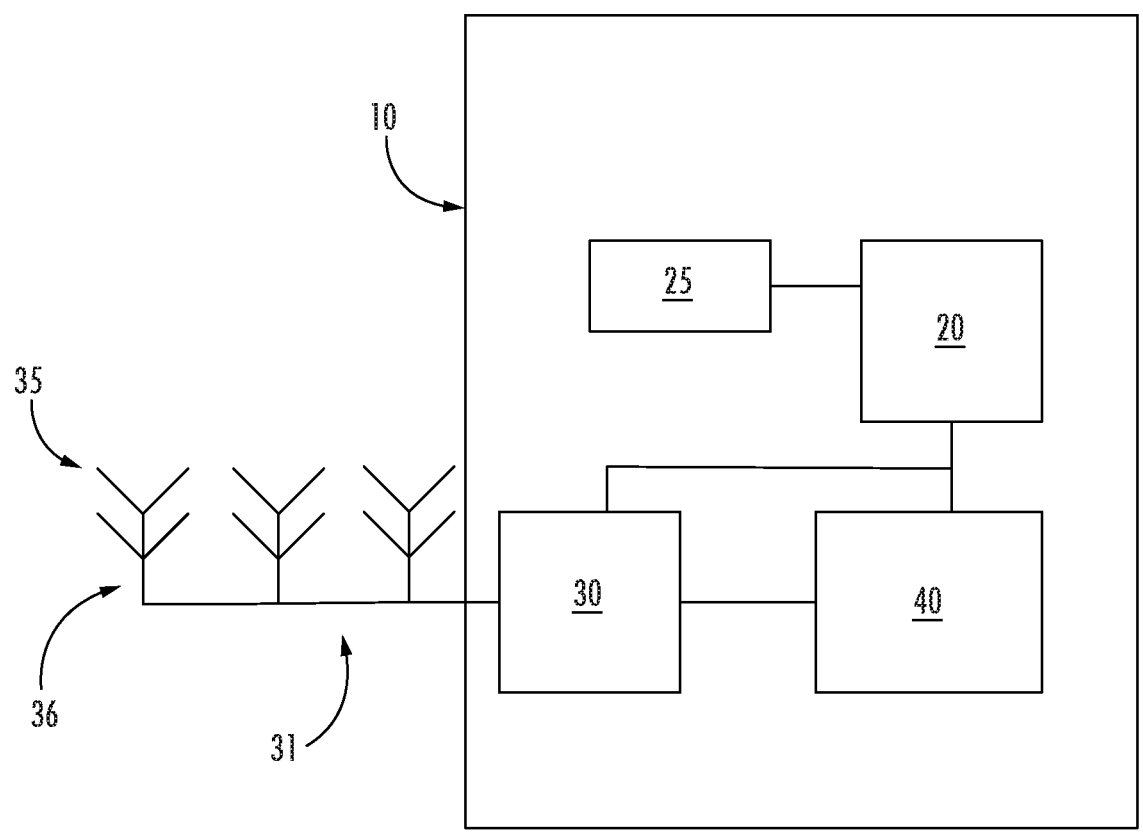
FIG. 1 is a block diagram of a representative locator device that may estimate angle of arrival according to one embodiment.

FIG. 1 shows a block diagram of a representative locator device 10 that may be mounted on the robotic appliance, also referred to as the movable device.

The locator device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the locator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the locator device 10. The instructions contained on this second computer readable non-transitory media may be downloaded onto the memory device 25 to allow execution of the instructions by the locator device 10.

The locator device 10 also includes a network interface 30, which may be a wireless interface including an antenna array 35.

The antenna array 35 comprises a plurality of antenna elements 36, which are arranged in a fixed, known pattern. For example, in one embodiment, the antenna array 35 may comprises a plurality of antenna elements 36 arranged in a linear fashion. In one embodiment, the same spacing is established between any two adjacent antenna elements 36. In another embodiment, the antenna elements 36 may be arranged as a two dimensional array. In one further embodiment, the spacing between any two adjacent antenna elements 36 in one direction is the same. In certain embodiments, the spacing between antenna elements 36 is related to the transmitted and received wavelengths. For example, the spacing between adjacent antenna elements 36 may be a half wavelength or less. The number of antenna elements 36 in the antenna array 35 is not limited by this disclosure.

The wireless signals first enter the network interface 30 through antenna array 35. The antenna array 35 is in electrical communication with a low noise amplifier (LNA). In certain embodiments, an analog switch may be used to select one of the antenna elements 36 to communicate with the LNA. The LNA receives a very weak signal from one antenna element 36 in the antenna array 35 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer, are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal. The analog switch may then be switched so as to select a different one of the antenna elements 36 so that the above process may be repeated for each antenna element 36. In certain embodiments, rather than utilizing an analog switch, the network interface may comprise a plurality of LNAs, mixers, PGAs and ADCs, so that the signals from all of the antenna elements 36 can be processed simultaneously.

The network interface 30 may support any wireless network, such as Bluetooth, Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the locator device 10 to communicate with other devices disposed on the network 31.

The locator device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the locator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the locator device 10. The instructions contained on this second computer readable media may be downloaded onto the memory device 25 to allow execution of the instructions by the locator device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the locator device 10, not its physical configuration.

Figure 2:
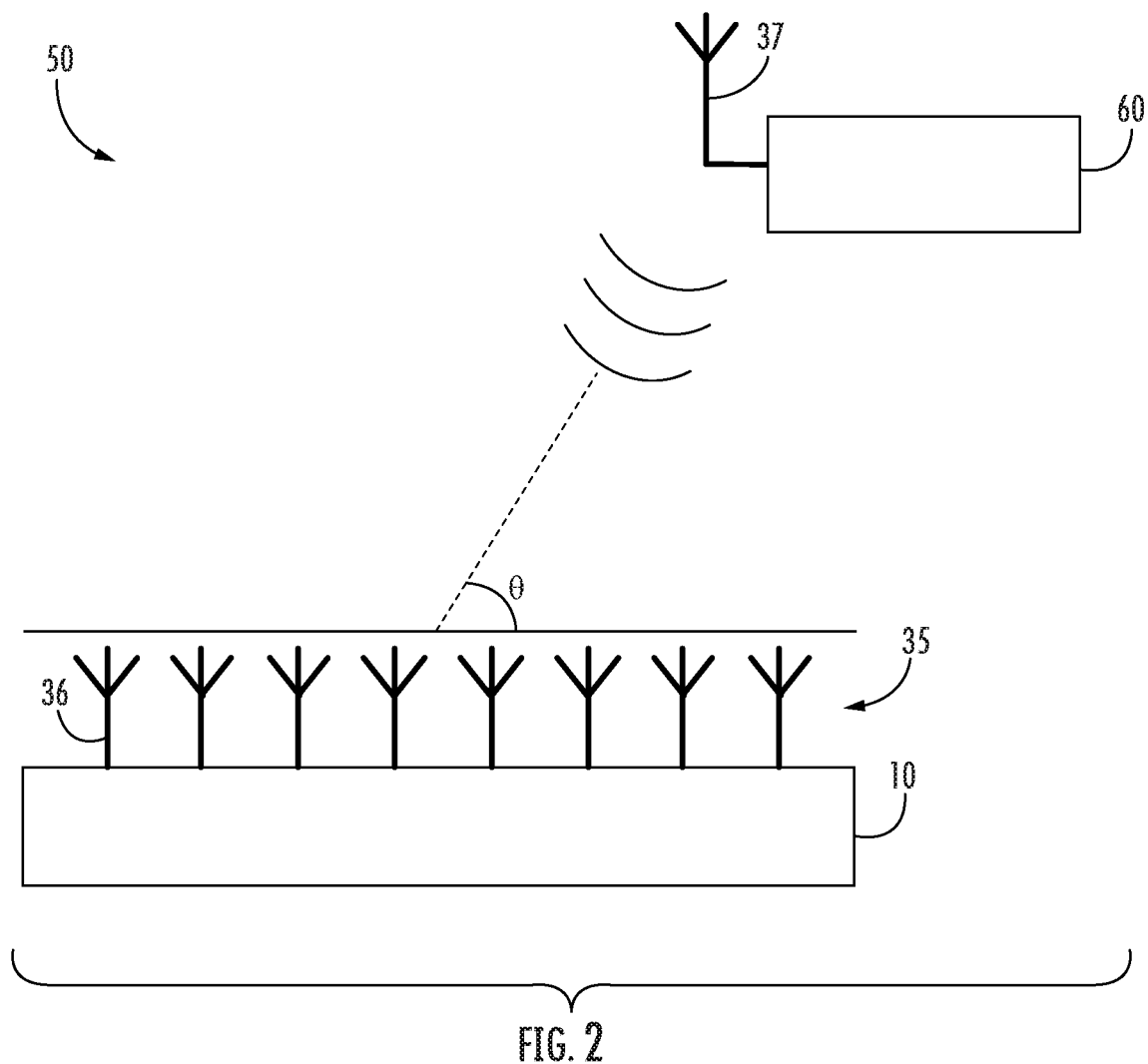
FIG. 2 shows a network having a locator device and at least one beacon according to one embodiment.

FIG. 2 shows a network 50 having at least one beacon 60 and a locator device 10. In certain embodiments, the beacon 60 may be a network device and contain many of the components described above and shown in FIG. 1. However, the beacon 60 may not have an antenna array. Rather, the beacon 60 may utilize a single antenna element 37. Further, the beacon 60 may have a smaller amount of memory and may have less computational ability.

In FIG. 2, the beacon 60 may be transmitting a signal toward the locator device 10. This signal may be referred to as a beacon signal. In certain embodiments, this beacon signal is transmitted using a network protocol, such as Zigbee or Bluetooth. In certain embodiments, the beacon 60 issues a plurality of beacon signals at a plurality of different frequencies. The beacon 60 may be offset from the locator device 10 in the azimuth and/or elevation directions. In this particular embodiment, the beacon 60 is shown as being offset in the azimuth direction. Because of this offset, the signal from the beacon 60 will reach the antenna elements 36 on the right side of the locator device 10 before it reaches the antenna elements 36 on the left side of the locator device 10. This difference in phase can be used to determine the direction of arrival, shown as θ in FIG. 2.

More specifically, the locator device 10 may utilize the I and Q signals described above to determine the amplitude and phase of the signal arriving at each of the antenna elements 36. Many algorithms are known that compute the direction of arrival based on the phase information obtained from an antenna array.

For example, the multiple signal classification (MUSIC) algorithm utilizes phase information to determine the direction of arrival. The MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph. Stated differently, a peak in the pseudo-spectrum corresponds to the angle of some signal entering the antenna array 35.

While this disclosure describes use of the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the spectrum, but each calculates a spectrum which can be used in the present disclosure.

Figure 3:
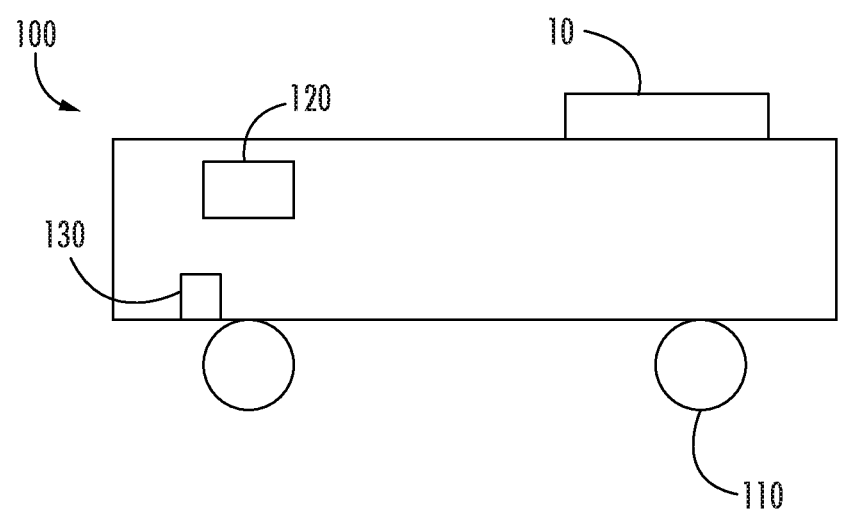
FIG. 3 shows a block diagram of the movable device according to one embodiment.

FIG. 3 shows a movable device 100. The movable device 100 comprises a propulsion mechanism, such as rollers, tracks, feet, or wheels 110. Further, the movable device 100 comprises a motor 120 that is used to drive the propulsion mechanism. The motor 120 may be electric, gasoline-powered, or any other type of motor. The locator device 10 is disposed on the movable device 100. Further, in certain embodiments, the movable device 100 comprises a motion sensor 130 that is able to detect the distance travelled by the movable device 100. The motion sensor 130 may be a magnetometer, an encoder that measures wheel rotations, Hall effect sensors, a LIDAR (Light Detection and Ranging) or any other suitable component. The processing unit 20 of the locator device 10 may be in communication with the motion sensor 130 and the motor 120. In this way, the locator device 10 may be aware of the motion of the movable device 100.

Having defined the architecture and functionality of the locator device 10 and the movable device 100, methods of automatically determining the position of the movable device 100, the beacons 60 and the working area will be described.

Figure 4:
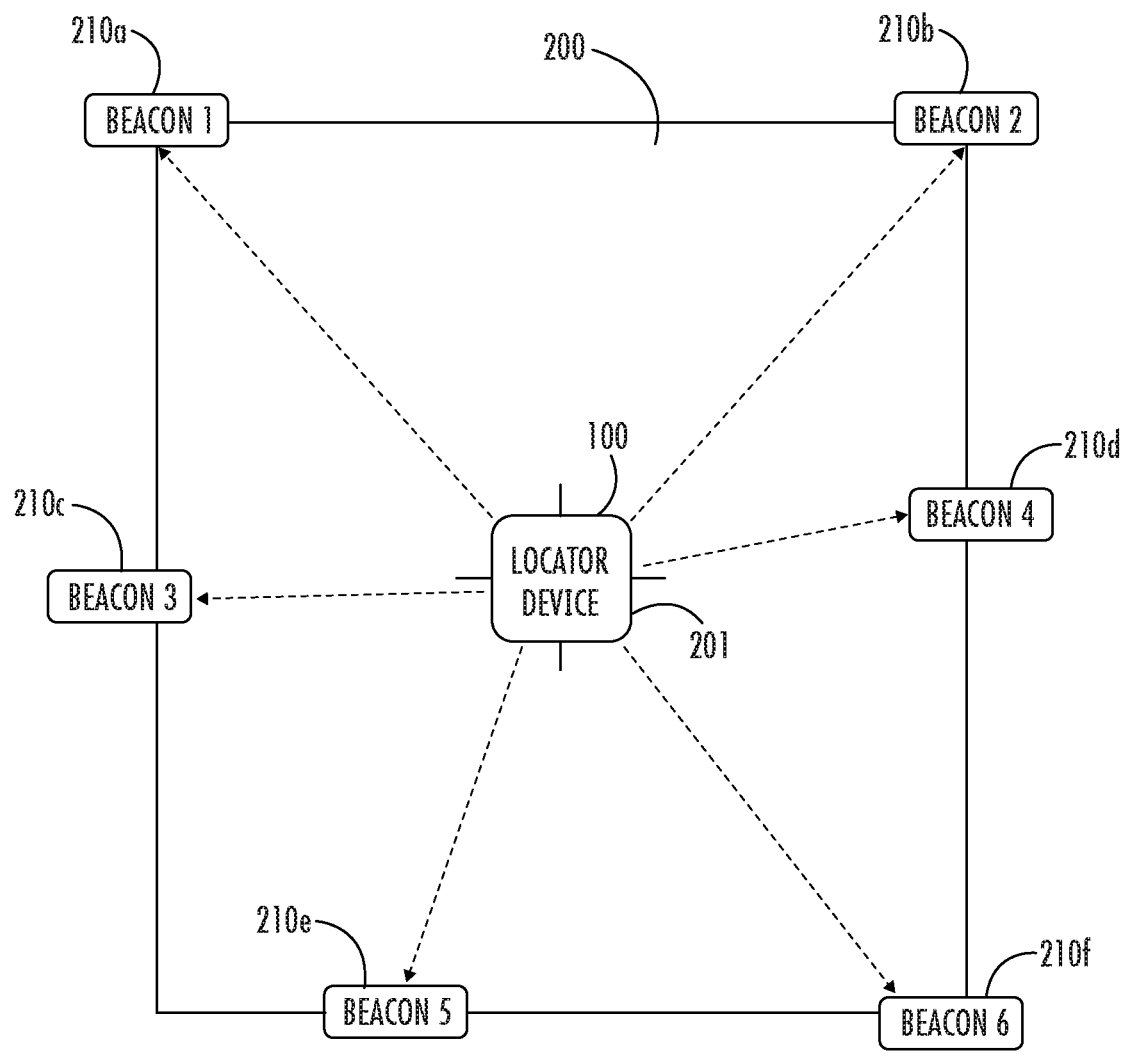
FIG. 4 shows the first step in a first calibration process that allows the locator device to determine the position of the beacons.

In a first embodiment, the movable device 100 comprises a motion sensor 130 that is able to accurately measure the distance travelled by the movable device 100. In this embodiment, as seen in FIG. 4, it is assumed that the movable device 100 is disposed in the working area 200. In certain embodiments, the movable device 100 may be placed in the middle of the working area 200. In certain embodiments, the perimeter of the working area 200 may be defined by the locations of the beacons 210a-210f. While six beacons are shown, it is understood that any number of beacons, greater than 2, may be used to define the working area. While in this first position 201, the locator device 10 disposed on the movable device 100 may determine an angle of arrival from beacon signals emitted from one or more of the beacons 210a-210f. In one embodiment, the locator device 10 determines angles of arrival from all of the beacons 210a-210f. In other embodiments, the locator device 10 determines the angle of arrival from a subset of the beacons 210a-210f.

Figure 5:
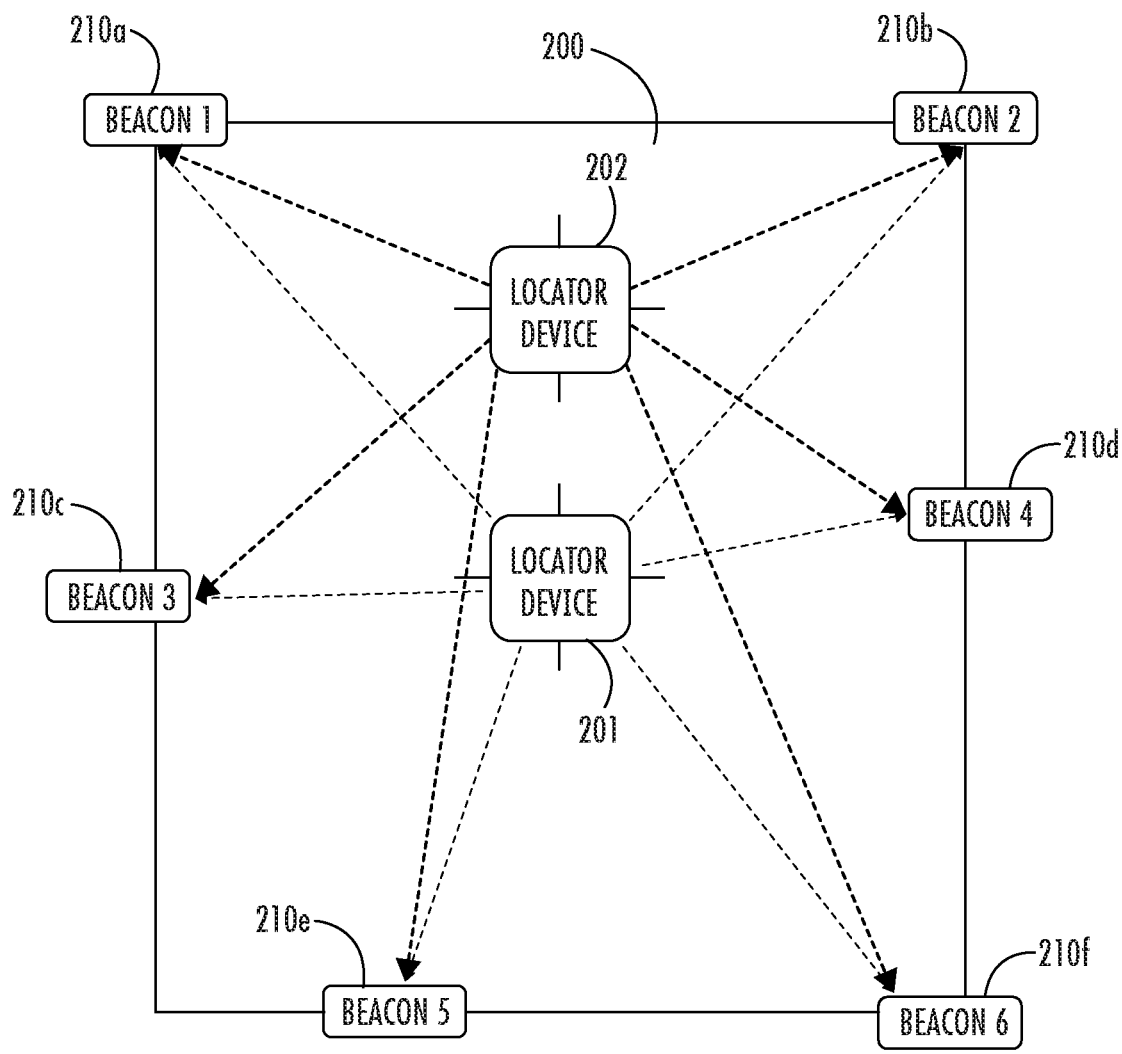
FIG. 5 shows the second step in the first calibration process of FIG. 4.

As shown in FIG. 5, the movable device 100 then moves in a straight line to a second position 202. In certain embodiments, the movable device 100 is oriented such that it does not head directly toward any of the beacons, as it will be unable to ascertain the location of such a beacon.

The distance moved is determined by the motion sensor 130 disposed on the movable device 100 and this value, referred to as d, is stored in the memory of the locator device 10. While in this second position 202, the locator device 10 disposed on the movable device 100 may determine an angle of arrival from beacon signals emitted from one or more of the beacons 210a-210f. In one embodiment, the locator device 10 determines angles of arrival from all of the beacons 210a-210f. In other embodiments, the locator device 10 determines the angle of arrival from that subset of the beacons 210a-210f which were monitored in the first position 201.

Based on the distance moved, d, and the angle of arrival determined at the first position 201 and the second position 202, the locator device 10 is able to locate each beacon 210a-210f and determine its own position within the working area 200.

Figure 6:
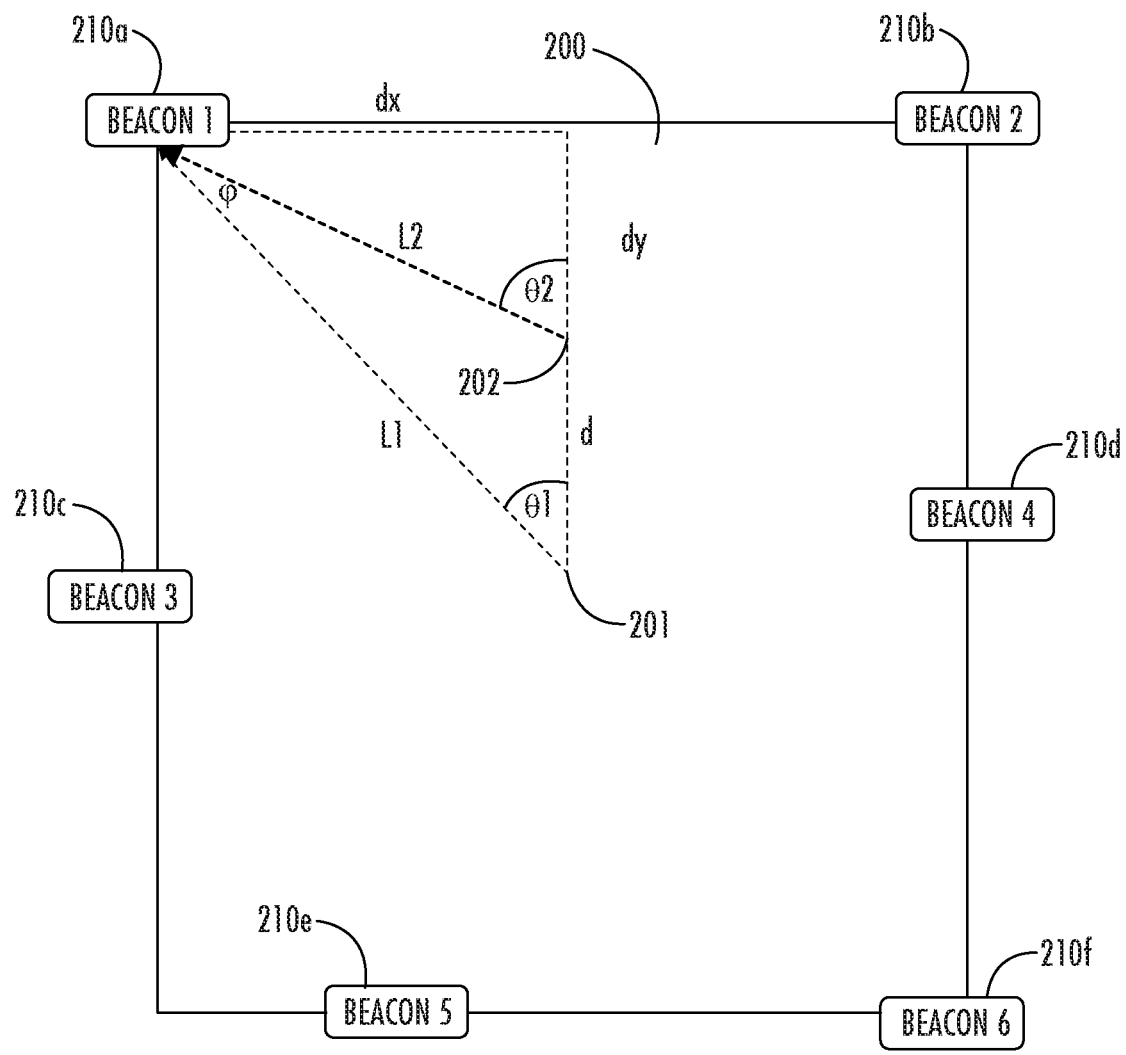
FIG. 6 shows the trigonometric relationships that are used to determine the position of one of the beacons for the first calibration process.

FIG. 6 shows one method that may be used to calculate the position of the beacon 210a. In this figure, the movable device begins at the first position 201 and the locator device 10 determines that the angle of arrival from beacon 210a is θ1. As described above, the movable device 100 then moves a distance, d, to the second position 202. The locator device 10 then determines that the angle of arrival from beacon 210a is θ2.

Using the law of sines, it is known that:

$$\frac{d}{\sin(\varphi)} = \frac{L2}{\sin(\theta 1)} = \frac{L1}{\sin(180 - \theta 2)}$$

Thus, L1 can be determined to be:

$$L1 = \frac{d * \sin(\theta 2)}{\sin(\varphi)}$$

and, L2 can be determined to be:

$$L2 = \frac{d * \sin(\theta 1)}{\sin(\varphi)}$$

Further, the angle φ is defined as 180−(180−θ2)−θ1, or simply θ2−θ1.

Further, it is assumed in this example, that the movable device 100 is moved in the y direction, such that the coordinates at the first position 201 may be defined as (x,y) and the coordinates at the second position 202 may be defined as (x,y+d).

Using this information and this coordinate system, the location of the beacon 210a relative to the first position 201, may be calculated. In other words, the locator device 10 may calculate two offsets for the beacon. In one embodiment, the offsets may be in the Y direction, which is parallel to the direction of travel, and the X direction, which is perpendicular to the direction of travel.

The offset in the x direction to the beacon 210a, denoted as dx can be calculated as follows:

$$\frac{dx}{L1} = \sin(\theta 1) \text{ and } \frac{dx}{L2} = \sin(\theta 2).$$

Similarly, the offset in the y direction to the beacon 210a, denoted as dy can be calculated as follows:

$$\frac{dy}{L1} = \cos(\theta 1)$$

Substituting L1 or L2 in one of the above equations, this results in the equation:

$$dx = \frac{d * \sin(\theta 1) * \sin(\theta 2)}{\sin(\varphi)} = \frac{d * \sin(\theta 1) * \sin(\theta 2)}{\sin(\theta 2 - \theta 1)}$$

Similarly, dy, which is the offset in the y direction from the first position 201, may be calculated as follows:

$$\frac{dy}{L1} = \cos(\theta 1)$$

Substituting L1 into the above equation, yields:

$$dy = \frac{d * \cos(\theta 1) * \sin(\theta 2)}{\sin(\theta 2 - \theta 1)}.$$

Thus, the position of beacon 210a relative to the locator device 10 may be determined, even though there is no location information available. The same procedure may be used to find the relative positions of beacons 210b-f. Thus, the locator device 10, using only angles of arrival and the distance travelled, d, is able to position itself within the working area 200 and identify coordinates for all of the beacons.

In certain embodiments, this process may be repeated a plurality of times to refine the calculated location of each beacon 210a-21f. For example, the movable device 100 may move forward a second distance, d2, and determine the angle of arrival for each beacon and repeat the calculations shown above. This may improve the accuracy of the calculated positions.

Once the locations of all of the beacons have been determined, the locator device 10 may operate in traditional reverse AoA mode, where it uses the known location of each beacon and the angle of arrival from each beacon to determine its own position. Specifically, if the locator device knows the location of three beacons and the angle of arrival from each of these beacons, it may use the law of sines and/or the law of cosines to calculate its position within the working area 200.

In other embodiments, this sequence is used to locate only a subset of the beacons 210a-210f. Once the location of three of beacons has been determined, the locator device 10 may then use traditional reverse AoA to find its own position based on the angle of arrival of beacon signals from these beacons. The locator device 10 may then move to two different locations, such as a third position and a fourth position, determine its own location using reverse AoA at each of these positions, and then use angle of arrival information for beacon signals from other beacons at these two positions to determine the location of the other beacons using the technique explained above. In certain embodiments, the locator device 10 may be able to find its own position based on the angle of arrival of beacon signals from two beacons, if the locator device 10 is able to determine its orientation, such as through the use of a compass.

While the description above and FIGS. 4-6 describe one embodiment, other embodiments are also possible. For example, the distance between two beacons may be determined by the user and supplied to the locator device 10. In this embodiment, the movable device 100 may not include a motion sensor 130 and may not be able to accurately determine its distance travelled.

Figure 7:
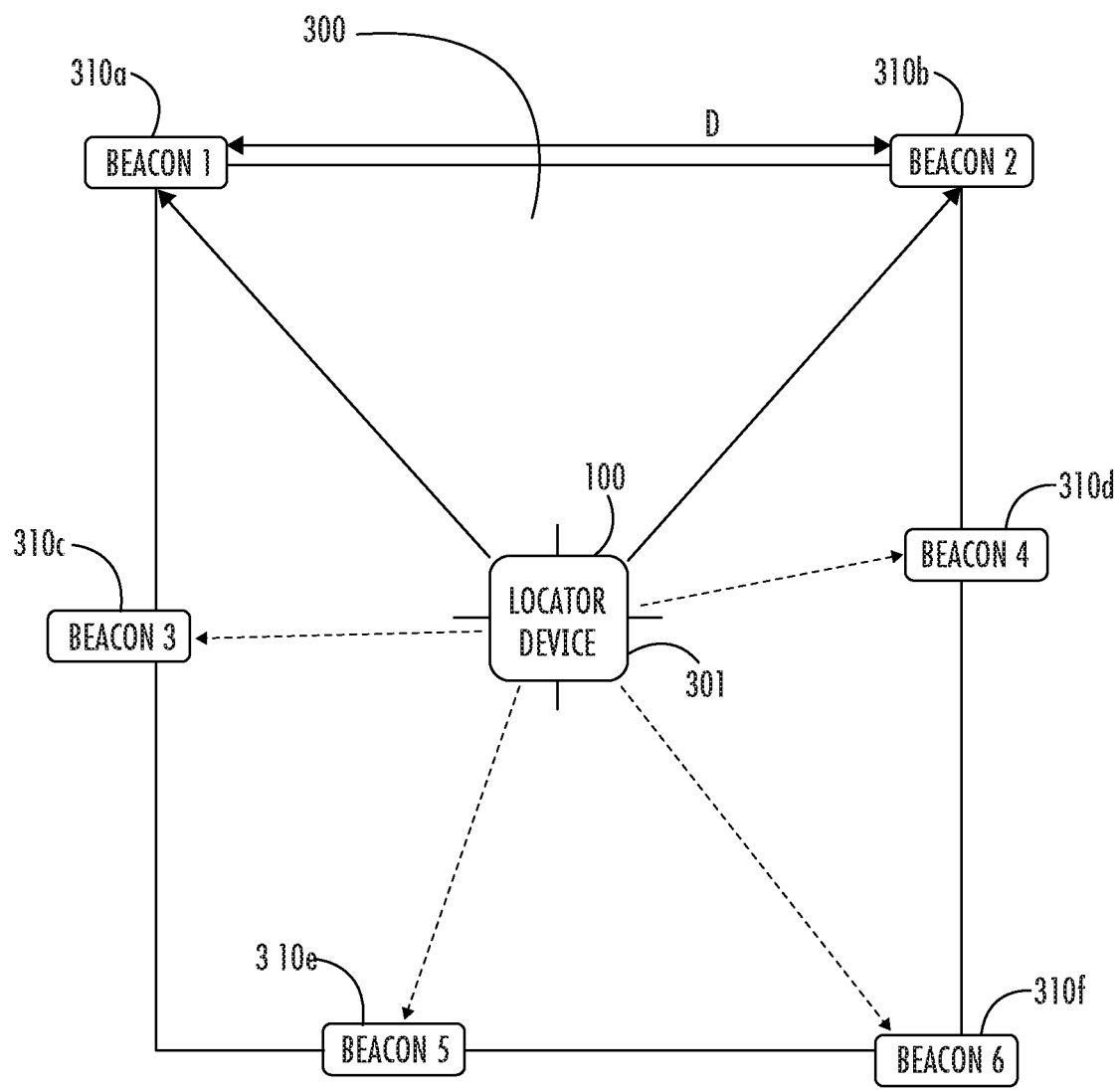
FIG. 7 shows the first step in a second calibration process that allows the locator device to determine the position of the beacons.
Figure 8:
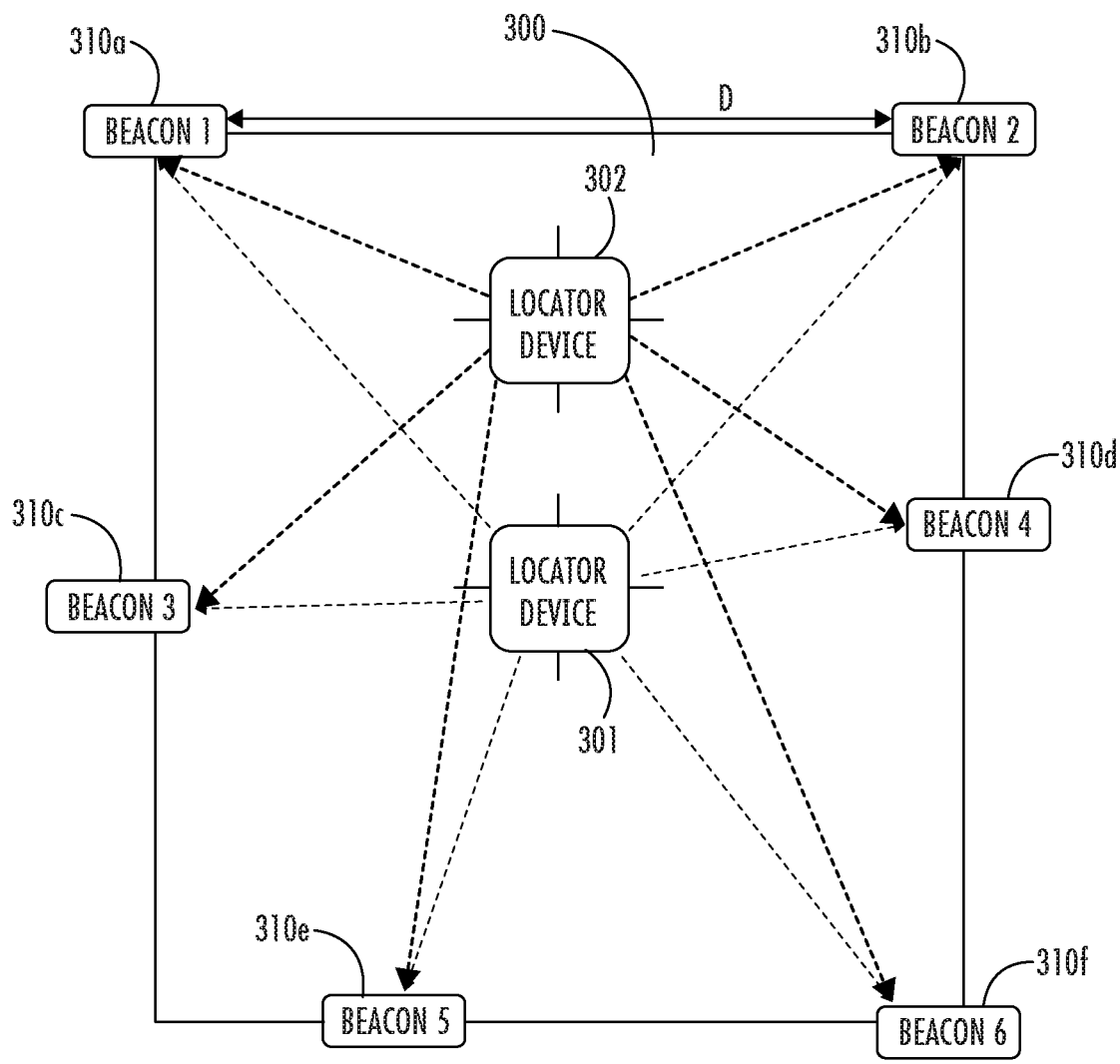
FIG. 8 shows the second step in the second calibration process of FIG. 7.
Figure 9:
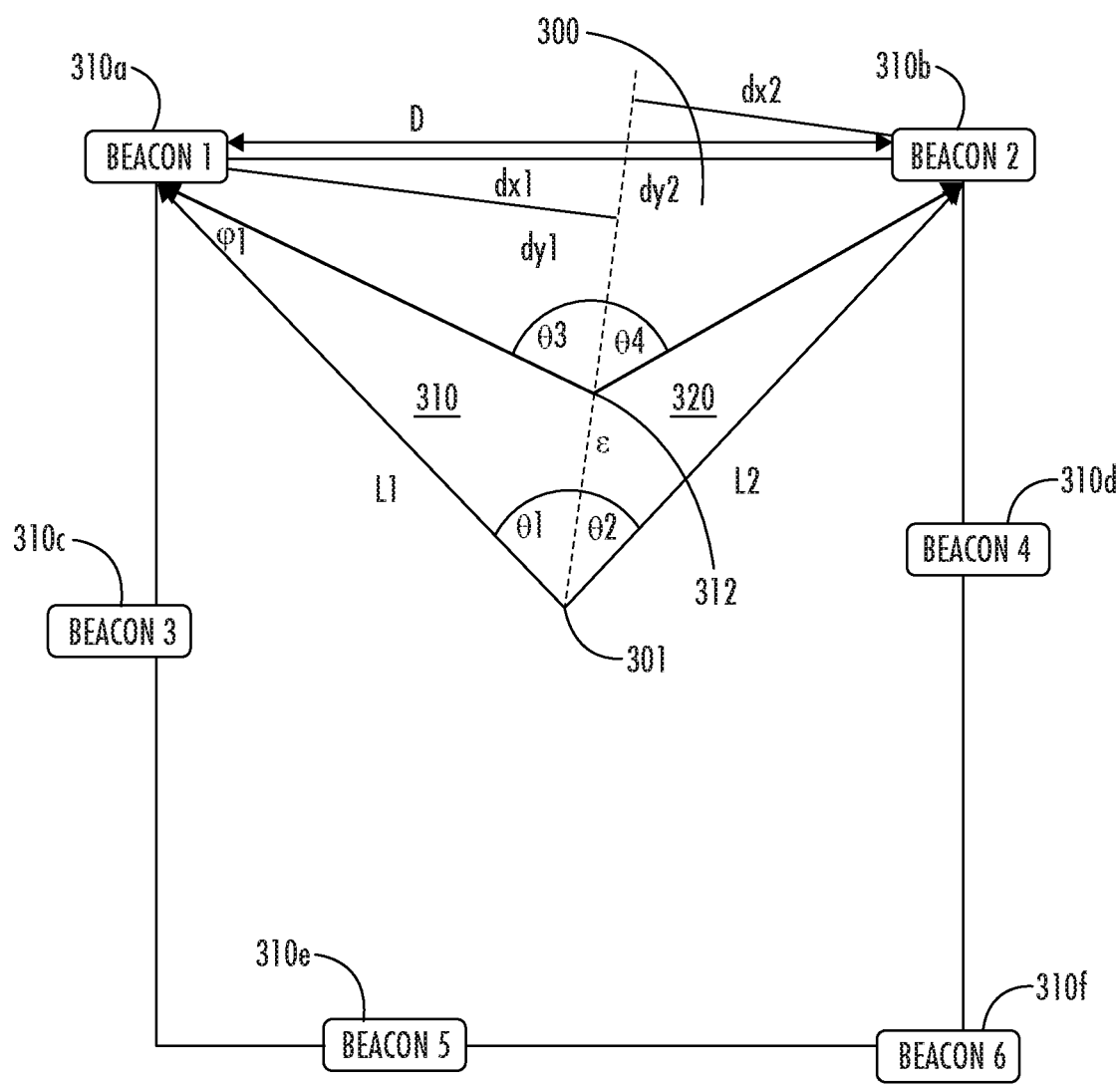
FIG. 9 shows the trigonometric relationships that are used to determine the position of two of the beacons for the second calibration process.

FIGS. 7-9 show this embodiment. In FIGS. 7-9, the distance between two of the beacons is known. This value may be supplied to the locator device 10, such as via an input device, or transmitted wirelessly.

As shown in FIG. 7, the movable device 100 is disposed at a first position 301 within the working area 300. The locator device 10 is aware that the distance between beacon 310a and beacon 310b is D. The locator device 10 then calculates the angle of arrival from beacon 310a and from beacon 310b.

As shown in FIG. 8, the movable device either moves or is moved to a second position 302 within the working area 300. In certain embodiments, the orientation of the movable device 100 is the same in the first position 301 and the second position 302. The locator device 10 then calculates the angle of arrival from beacon 310a and from beacon 310b.

Based on these measurements, the locator device 10 is able to determine the location of beacon 310a, beacon 310b and its position relative to these beacons.

FIG. 9 shows calculations that may be employed to determine these parameters.

Referring to triangle 310, and using the law of sines, it is known that:

$$\frac{\varepsilon}{\sin(\varphi 1)} = \frac{L1}{\sin(180 - \theta 3)} = \frac{L1}{\sin(\theta 3)}$$

Further, the angle φ1 is defined as 180−(180−θ3)−θ1, or simply θ3−θ1.

Thus, $$\frac{\varepsilon}{\sin(\theta 3 - \theta 1)} = \frac{L1}{\sin(\theta 3)}$$

and $$\varepsilon = \frac{L1 * \sin(\theta 3 - \theta 1)}{\sin(\theta 3)}$$

Referring to triangle 320 and using the law of sines, it is known that:

$$\frac{\varepsilon}{\sin(\varphi 2)} = \frac{L2}{\sin(180 - \theta 4)} = \frac{L2}{\sin(\theta 4)}$$

Further, the angle φ2 is defined as 180−(180−θ4)−θ2, or simply θ4−θ2.

Thus, $$\frac{\varepsilon}{\sin(\theta 4 - \theta 2)} = \frac{L2}{\sin(\theta 4)}$$

and $$\varepsilon = \frac{L2 * \sin(\theta 4 - \theta 2)}{\sin(\theta 4)}$$

Since ε is constant, $$\frac{L1 * \sin(\theta 3 - \theta 1)}{\sin(\theta 3)} = \frac{L2 * \sin(\theta 4 - \theta 2)}{\sin(\theta 4)}$$

Thus, L2 can be determined to be:

$$L2 = \frac{L1 * \sin(\theta 4) * \sin(\theta 3 - \theta 1)}{\sin(\theta 3) * \sin(\theta 4 - \theta 2)}$$

Thus, L2 can be expressed in terms of L1. Further using the law of cosines, it can be seen that:

$$D^2 = L1^2 + L2^2 - 2*L1*L2*\cos(\theta 1 + \theta 2)$$

Substituting for L2 and solving yields:

$$L1 = \frac{d}{\sqrt{1 + \gamma^2 - 2*\gamma*\cos(\theta 1 + \theta 2)}}$$

where $$\gamma = \frac{\sin(\theta 4) * \sin(\theta 3 - \theta 1)}{\sin(\theta 3) * \sin(\theta 4 - \theta 2)}$$

Since d, θ1, θ2, θ3, and θ4 are all known quantities, L1 and L2 can be solved for.

Further, it is assumed in this example, that the movable device 100 is moved in the y direction, such that the coordinates at the first position 301 may be defined as (x,y) and the coordinates at the second position 302 may be defined as (x,y+ε).

Using this information and this coordinate system, the location of the beacon 310a relative to the first position 301, referred to as the offset in two dimensions, may be calculated. In this description, the Y direction is parallel to the orientation of the movable device 100. The X direction is perpendicular to the Y direction. The offset in the x direction to the beacon 310a, denoted as dx1 and the offset in the x direction to the beacon 310b, denoted as dx2 can be calculated as follows:

$$\frac{dx1}{L1} = \sin(\theta 1) \text{ and } \frac{dx2}{L2} = \sin(\theta 2).$$

Similarly, the offset in the y direction to the beacon 310a, denoted as dy1 and the offset in the y direction to the beacon 310b, denoted as dy2 can be calculated as follows:

$$\frac{dy1}{L1} = \cos(\theta 1) \text{ and } \frac{dy2}{L2} = \cos(\theta 2)$$

The location of the beacons 310a, 310b relative to the current position of the movable device (i.e. the second position 302) is obtained by simply subtracting ε from the two dy values.

The above calculations show that the locator device 10 may determine its location within the working area 300 where the only available information is the distance between two beacons. Once the locator device 10 is able to determine its position, it is able to determine the location of all of the other beacons 310c-310f. In one embodiment, the locator device obtains angle of arrival measurements for all of the beacons at first position 301 and second position 302. Once the locator is able to determines its position at each of these locations, it can use the Law of Sines, as described above to determine the location of all of the other beacons.

Further, the movable device 100 may be moved to a third location and the steps described above may be repeated to improve the accuracy of the calculations. Once the locator device 10 has determined the location of each beacon, it can utilize reverse AoA, where it calculates its own position based on the positions of each beacon and the angle of arrival from each beacon.

In certain embodiments, the calculations shown in FIGS. 6 and 9 are performed using the processing unit 20 of the locator device 10. However, in other embodiments, the locator device 10 may transmit data to a remote server, where the calculations are performed. For example, the locator device 10 may transfer distance and angle of arrival to a remote server, which calculates the offsets. The remote server may then transmit the offsets back to the locator device 10. These communications may occur wirelessly, such as by utilizing the network interface 30 and antenna array 35.

Figure 10:
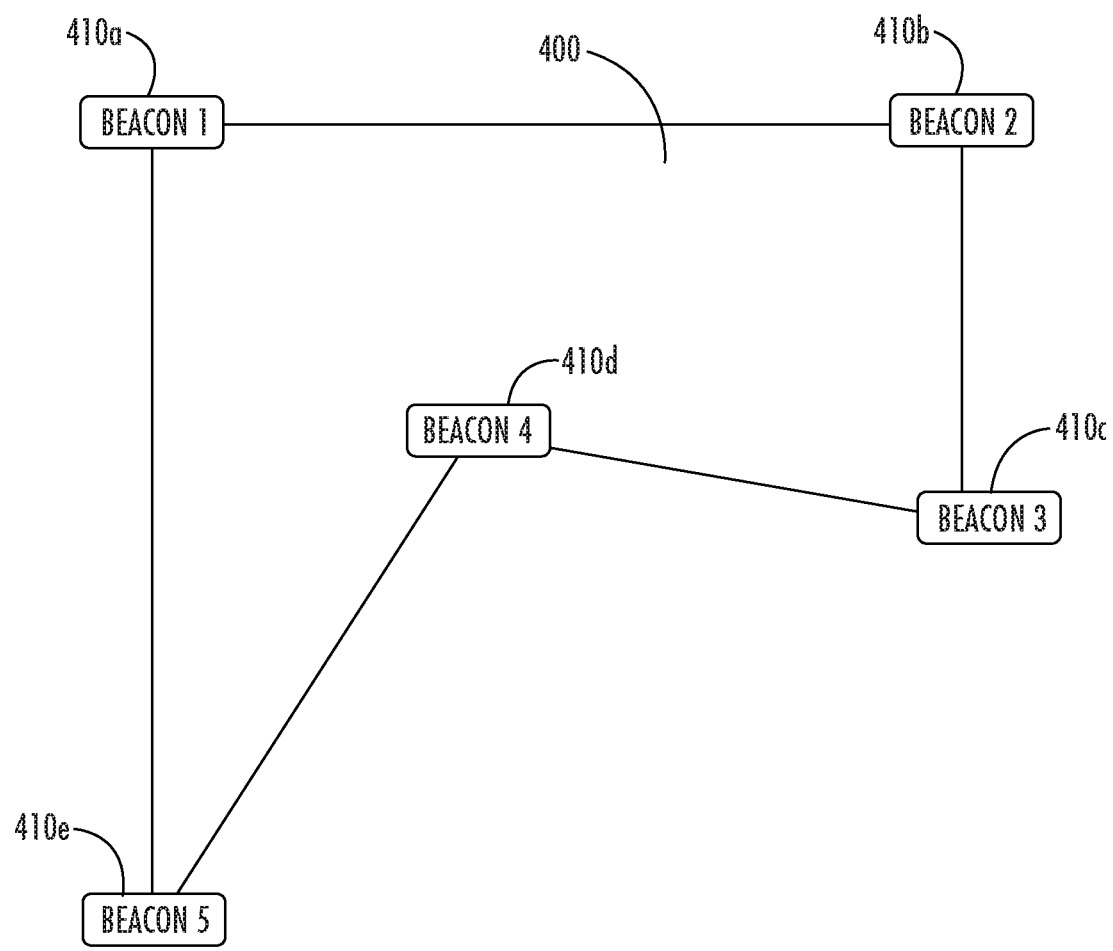
FIG. 10 shows an irregular shaped working area.

While FIGS. 4-9 show the working area as being rectangular, the disclosure is not limited to this configuration. FIG. 10 shows an irregularly shaped working area 400 that is defined by the beacons 410a-410e. Thus, the size and shape of the working area is not limited by this disclosure.

In certain embodiments, as shown in FIG. 10, the beacons 410a-410e are used to define the corners of the perimeter. However, other embodiments are also possible.

For example, in certain embodiments, the shape of the working area may be predetermined, and the working area is defined as the area that has the predetermined shape and has the beacons located along the perimeter of that predetermined shape. For example, FIG. shows a working area in the shape of a rectangle, where the beacons 210a-210e are all disposed along the perimeter of the working area, but not necessarily at the corners.

In other embodiments, the user may be able to create the working area, based on the location of the beacons. For example, the user may have a software application that allows the user to define the working area. This may be done after the movable device 100 has identified the location of each beacon. The locations of the beacons may be indicated on a map visible on a user display associated with this software application. This software application may be executed on a mobile phone or tablet. The user may then draw or otherwise designate the working area, which is referenced to the beacons. This working area may then be downloaded or transmitted to the locator device 10 on the movable device 100.

Thus, in all embodiments, the working area is defined based on the location of the beacons. In certain embodiments, the beacons are placed on the perimeter of the working area so that the working area is defined by the beacons. In other embodiments, the working area is generated based on the locations of the beacons and provided to the movable device 100.

Having explained two calibration mechanisms that allows the locator device 10 to determine the location of each beacon as well as its own position, this information may be used in a number of ways.

For example, in one embodiment, the movable device 100 may use its location, and the locations of the beacons to determine a path whereby the movable device 100 traverses the entirety of the working area in an efficient manner. For example, the movable device 100 may be a lawnmower, vacuum cleaner, pool cleaner or other similar appliance or tool that preferentially covers the entirety of the working area. By knowing the dimensions of the working area and its location, the movable device 100 can traverse this working area efficiently. Algorithms to traverse a fixed area in an efficient manner are well known and the algorithm is not limited by this disclosure.

Figure 11:
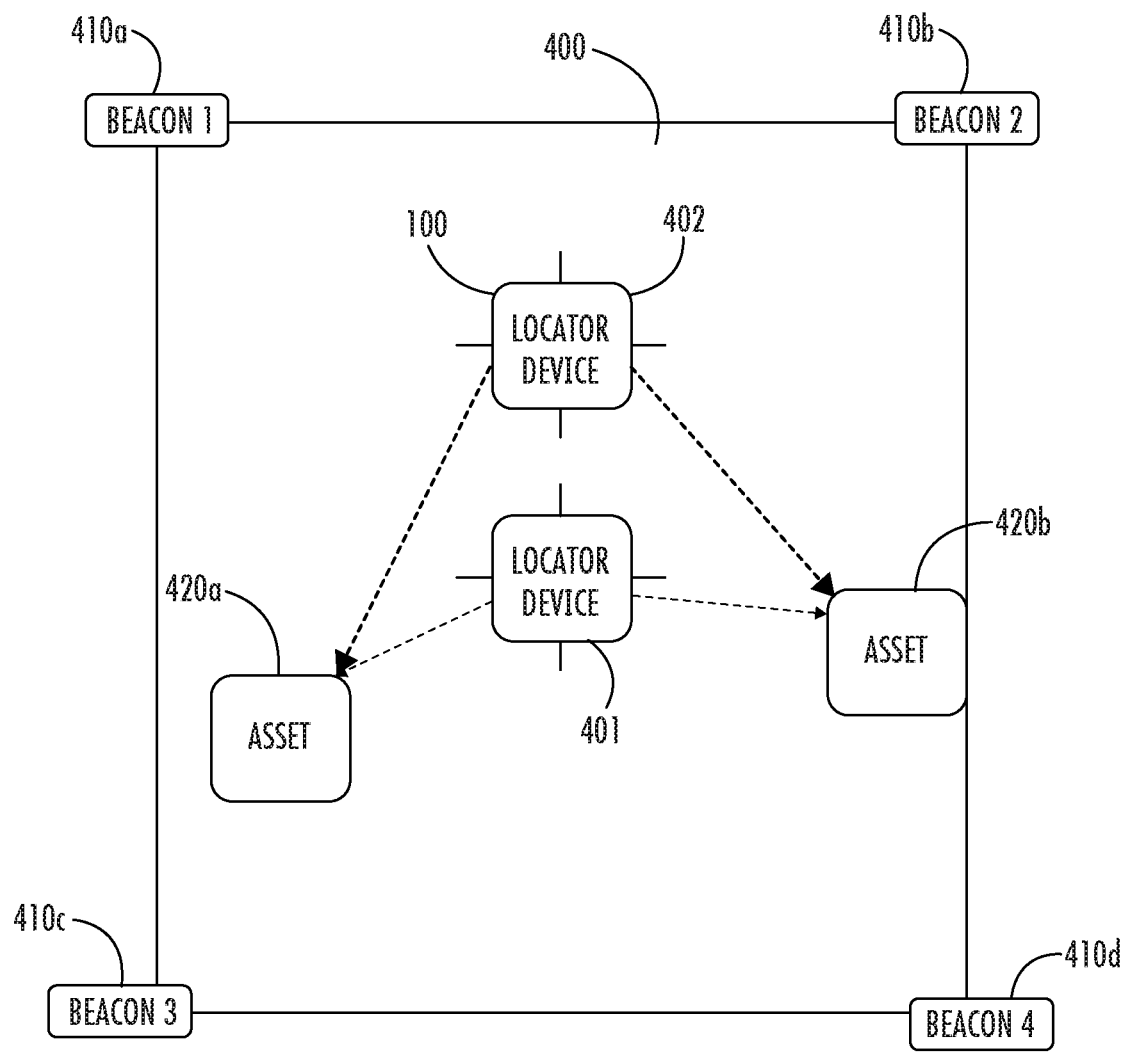
FIG. 11 shows an asset finding application.

In another embodiment, this information can be used in an asset finding application. For example, as shown in FIG. 11, the movable device 100 may be a truck or forklift. The working area 400 is defined by beacons 410a-410d. Once the locator device 10 has the ability to determine its own location, it is also able to determine the location of assets within a warehouse. These assets have the ability to transmit a beacon signal to the locator device 10.

For example, the movable device 100 may be in a first position 401, and the movable device 100 is aware of its location. This may be acquired using either of the calibration techniques described above. Alternatively, its location may be acquired using reverse AoA, once the locator device 10 has determined the location of at least two beacons using of the techniques described above.

The movable device 100 then detects the angle of arrival from asset 420a and asset 420b. The movable device 100 then moves to second position 402, and again detects the angle of arrival from asset 420a and asset 420b. Knowing its exact coordinates for first position 401 and second position 402 and the corresponding angles of arrival, the locator device 10 can then determine the exact location of asset 420a and asset 420b.

This may be helpful in a number of ways. For example, while angle of arrival provides directional information, it does not directly provide distance information (although this may be estimated based on RSSI). In contrast, this technique allows the locator device to know the exact location of the assets. Thus, minimal routes can be calculated that allows the forklift to retrieve each of the desired assets in an efficient way.

Figure 12:
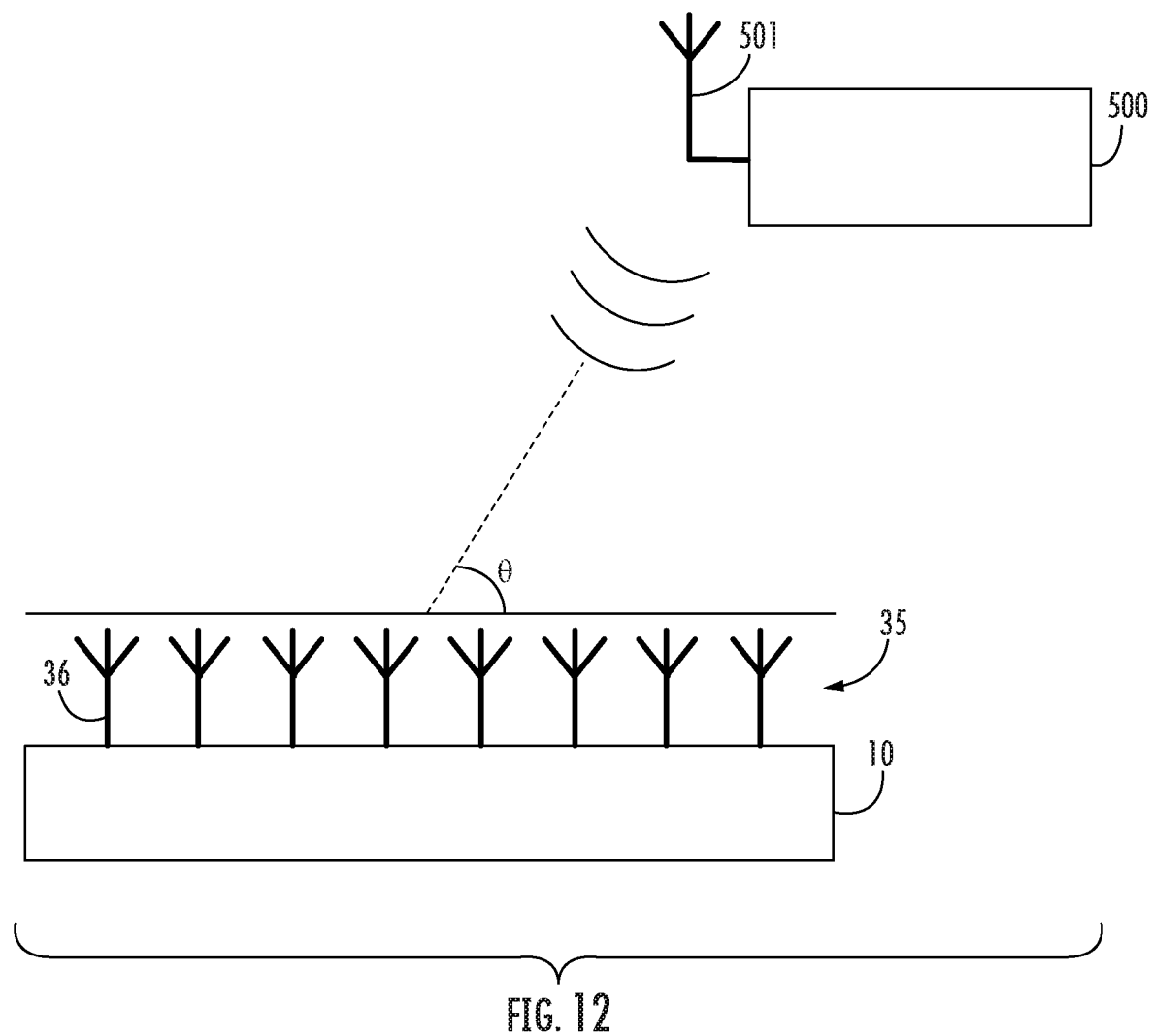
FIG. 12 shows an Angle of Departure implementation.

Furthermore, while the present disclosure describes an angle of arrival, it is understood that this technique may be used to improve the accuracy of angle of departure. In this scenario, the device roles are reversed and, referring to FIG. 12, the beacons of the previous embodiments are replaced with anchors 500. Each anchor 500 has a single antenna 501. Further, the locator device 10 still includes an antenna array 35. In this embodiment, the locator device 10 transmits a signal and the anchor 500 receives the signal. In this embodiment, the anchor 500 knows the geometry of the antenna array 35, switching sequence and switching timings for the locator device 10. Based on that information, the anchor 500 knows which IQ-data sample and which antenna element 36 of the antenna array 35 are associated with one another. The antenna array geometry sent by the locator device 10 is needed by the anchor 500 for the angle estimation algorithm, which resides on the anchor 500 or on some processing unit in communication with the anchor 500. The results of this angle estimation algorithm are then transmitted to the locator device 10. The locator device 10 is then able to perform all of the calibrations described above.

The present system has many advantages. Autonomous devices, such as appliances and tools, are becoming more popular. The present disclosure describes several methods that may be used to allow the device to acquire the location of all of the beacons, its own location and the shape of the working area with minimal input from the user. In the first embodiment, the user simply has to set up the beacons 210a-210f at desired locations and then place the movable device in the working area. The movable device 100 is then able to calculate of the location information with no other input from the user. In the second embodiment, the user only needs to supply one dimension to the movable device 100. This is much simpler than current techniques and is far less prone to error.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a location of a movable device and a plurality of beacons, the method comprising:
    disposing the movable device at a first position, wherein the movable device comprises a locator device, having an antenna array;
    using the locator device to determine an angle of arrival of beacon signals transmitted by at least one of the plurality of beacons while at the first position;
    moving the movable device a known distance to a second position;
    using the locator device to determine an angle of arrival of beacon signals transmitted by the at least one of the plurality of beacons while at the second position; and
    determining an offset, in two dimensions, of each of the at least one of the plurality of beacons relative to the movable device, based on the angle of arrival of beacon signals transmitted by at least one of the plurality of beacons while at the first position and the second position.

2. The method of claim 1, wherein the movable device comprises a motion sensor and a motor; and the movable device moves itself to the second position and determines the known distance based on the motion sensor.

3. The method of claim 1, wherein the locator device determines an angle of arrival for all of the plurality of beacons at the first position and the second position.

4. The method of claim 1, wherein the locator device determines an angle of arrival for at least three of the plurality of beacons at the first position and the second position.

5. The method of claim 1, further comprising operating the locator device in reverse AoA mode after locations of at least three of the plurality of beacons have been determined.

6. The method of claim 5, further comprising:
    moving the movable device to a third position after determining the locations of the at least three of the plurality of beacons;
    using the locator device to perform reverse AoA to determine its position based on angle of arrival information from the at least three of the plurality of beacons;
    using the locator device to determine an angle of arrival of beacon signals transmitted by a different one of the plurality of beacons while at the third position;
    moving the movable device to a fourth position;
    using the locator device to perform reverse AoA to determine its position based on angle of arrival information from the at least three of the plurality of beacons;
    using the locator device to determine an angle of arrival of beacon signals transmitted by the different one of the plurality of beacons while at the fourth position; and
    determining the offset, in two dimensions, of the different one of the plurality of beacons relative to the movable device.

7. The method of claim 5, further comprising:
    using the locator device to perform reverse AoA to determine its position based on angle of arrival information from the at least three of the plurality of beacons while at a third location;
    determining an angle of arrival of a signal from an asset disposed within a working area while at the third location;
    moving the movable device to a fourth location;
    using the locator device to perform reverse AoA to determine its position based on angle of arrival information from the at least three of the plurality of beacons while at the fourth location;
    determining the angle of arrival of the signal from the asset while at the fourth location; and
    determining a location of the asset relative to the movable device based on the angle of arrival at the third location and the fourth location.

8. The method of claim 1, further comprising using the locator device to determine a working area within which the movable device operates.

9. The method of claim 8, wherein the plurality of beacons are disposed at corners of the working area or are disposed along a perimeter of the working area.

10. The method of claim 1, further comprising:
    transmitting a map to a user, wherein locations of the plurality of beacons are indicated on the map;
    allowing the user to indicate a working area on the map; and
    transmitting the working area to the locator device.

11. A software program, disposed on a non-transitory storage medium, which when executed by a processing unit disposed on a movable device having a locator device, enables the movable device to:
    use the locator device to determine an angle of arrival of beacon signals transmitted by at least one of a plurality of beacons while at a first position;
    move the movable device a known distance to a second position;
    use the locator device to determine an angle of arrival of beacon signals transmitted by the at least one of the plurality of beacons while at the second position; and
    determine an offset, in two dimensions, of each of the at least one of the plurality of beacons relative to the movable device, based on the angle of arrival of beacon signals transmitted by the at least one of the plurality of beacons while at the first position and the second position.

12. The software program of claim 11, wherein the software program enables the movable device to:
  operate the locator device in reverse AoA mode after locations of at least three of the plurality of beacons have been determined.

13. The software program of claim 12, wherein the software program enables the movable device to:
  move the movable device to a third position after determining the locations of the at least three of the plurality of beacons;
  use the locator device to perform reverse AoA to determine its position based on angle of arrival information from the at least three of the plurality of beacons;
  use the locator device to determine an angle of arrival of beacon signals transmitted by a different one of the plurality of beacons while at the third position;
  move the movable device to a fourth position;
  use the locator device to perform reverse AoA to determine its position based on angle of arrival information from the at least three of the plurality of beacons;
  use the locator device to determine an angle of arrival of beacon signals transmitted by the different one of the plurality of beacons while at the fourth position; and
  determine the offset, in two dimensions, of the different one of the plurality of beacons relative to the movable device.

14. The software program of claim 12, wherein the software program enables the movable device to:
  use the locator device to perform reverse AoA to determine its position based on angle of arrival information from the at least three of the plurality of beacons while at a third location;
  determine an angle of arrival of a signal from an asset disposed within a working area while at the third location;
  move the movable device to a fourth location;
  use the locator device to perform reverse AoA to determine its position based on angle of arrival information from the at least three of the plurality of beacons while at the fourth location;
  determine the angle of arrival of the signal from the asset while at the fourth location; and
  determine a location of the asset relative to the movable device based on the angle of arrival at the third location and the fourth location.

15. The software program of claim 11, wherein the software program enables the movable device to:
  use the locator device to determine a working area within which the movable device operates.

16. A movable device for determining its location and a location of a plurality of beacons, comprising:
  a propulsion mechanism;
  a locator device, comprising:
    an antenna array;
    a processing unit;
    a memory device, comprising instructions, which when executed by the processing unit, enable the movable device to:
      determine an angle of arrival of beacon signals transmitted by at least one of the plurality of beacons while at a first position;
      move a known distance to a second position;
      determine an angle of arrival of beacon signals transmitted by the at least one of the plurality of beacons while at the second position; and
      determine an offset, in two dimensions, of each of the at least one of the plurality of beacons relative to the movable device, based on the angle of arrival of beacon signals transmitted by at least one of the plurality of beacons while at the first position and the second position.

17. The movable device of claim 16, wherein the memory device further comprises instructions, which when executed by the processing unit, enable the movable device to:
  operate the locator device in reverse AoA mode after locations of at least three of the plurality of beacons have been determined.

18. The movable device of claim 17, wherein the memory device further comprises instructions, which when executed by the processing unit, enable the movable device to:
  move to a third position after determining the locations of the at least three of the plurality of beacons;
  perform reverse AoA to determine its position based on angle of arrival information from the at least three of the plurality of beacons;
  determine an angle of arrival of beacon signals transmitted by a different one of the plurality of beacons while at the third position;
  move to a fourth position;
  perform reverse AoA to determine its position based on angle of arrival information from the at least three of the plurality of beacons;
  determine an angle of arrival of beacon signals transmitted by the different one of the plurality of beacons while at the fourth position; and
  determine the offset, in two dimensions, of the different one of the plurality of beacons relative to the movable device.

19. The movable device of claim 17, wherein the memory device further comprises instructions, which when executed by the processing unit, enable the movable device to:
  perform reverse AoA to determine its position based on angle of arrival information from the at least three of the plurality of beacons while at a third location;
  determine an angle of arrival of a signal from an asset disposed within a working area while at the third location;
  move to a fourth location;
  perform reverse AoA to determine its position based on angle of arrival information from the at least three of the plurality of beacons while at the fourth location;
  determine the angle of arrival of the signal from the asset while at the fourth location; and
  determine a location of the asset relative to the movable device based on the angle of arrival at the third location and the fourth location.

20. The movable device of claim 16, wherein the memory device further comprises instructions, which when executed by the processing unit, enable the movable device to:
  determine a working area within which the movable device operates.

* * * * *